United States Patent [19]

Moreno

[11] Patent Number: 4,998,576

[45] Date of Patent: Mar. 12, 1991

[54] REVERSING SCREW, AIRCRAFT WINDOW SHADE MECHANISM FOR A MODULAR AIRCRAFT WINDOW

[75] Inventor: Gilbert C. Moreno, San Antonio, Tex.

[73] Assignee: MSA Aircraft Interior Products, Inc., San Antonio, Tex.

[21] Appl. No.: 415,016

[22] Filed: Sep. 29, 1989

[51] Int. Cl.⁵ .............................................. E06B 3/32
[52] U.S. Cl. ..................................... 160/90; 160/309
[58] Field of Search ................. 160/90, 84.1, 89, 309, 160/321

[56] References Cited

U.S. PATENT DOCUMENTS 4,679,610  7/1987  Spraggins ...................... 160/84.1 X
4,917,167  4/1990  Voss et al. ......................... 160/84.1

Primary Examiner—Blair M. Johnson
Attorney, Agent, or Firm—Gunn, Lee & Miller

[57] ABSTRACT

A reversing screw (102) for a modular self-contained window insert (10), which reversing screw (102) allows movement of the window shade (16) between a full-opened and full-closed position, when the throw of the reversing screw (102) is less than the distance between the opened and closed position of the window shade (16).

10 Claims, 3 Drawing Sheets

REVERSING SCREW, AIRCRAFT WINDOW SHADE MECHANISM FOR A MODULAR AIRCRAFT WINDOW

FIELD OF THE INVENTION

The present invention relates generally to the field of aircraft windows and, more specifically, to a reversing screw in a self-contained, modular double-pane window insert having a collapsible shade.

BACKGROUND OF THE INVENTION

Designers of aircraft interiors desire an attractive window, yet one which is functional. More specifically, aircraft interior designers must design the aircraft windows within the constraints of a specific air frame structure. Frequently, the shape of the cabin windows is dictated by the spacing of stress carrying aircraft main frame members. Such restraints often require that the vertical axis of the window be greater than the horizontal axis.

When windows contain an enclosed shade, such as that disclosed in U.S. Pat. No. 4,679,610, (the specifications of which are incorporated herein by references as if fully set forth), it is often desirous to have the shade actuator level resting along the upper or lower edge of the frame and moving in a horizontal, or left-right direction.

When windows contain an elongated vertical axis, it is required that the movement of the shade between a full-open and full-closed position be completed through the movement of a horizontally mounted lever over a distance less than the distance between the opened and closed position of the shade. As such, a reversible distance multiplier is required.

SUMMARY OF THE INVENTION

The invention disclosed and claimed herein is designed to allow an aircraft window shade to move vertically between a full-opened and a full-closed position through the movement of a horizontally operated actuator, whose throw is less than the distance between the full-opened and full-closed position of the window shade.

It is the purpose of this invention to provide for an actuator of a window shade capable of moving the shade between a full-opened and full-closed position.

It is a further object of this invention to provide for a reversing screw and rifled coupler combination which will allow a window shade to be moved from a full-opened to a full-closed position.

It is the further object of this invention to provide for a horizontal reversing screw and rifled coupler combination which drives a cog gear and cog belt combination which allows the window shade to be moved vertically between a full-opened and a full-closed position.

This result is accomplished by using a horizontally mounted reversing screw and rifled coupler, which coupler is attached to a manually operated lever which when moved slides the rifled coupler over the reversing screw forcing the screw to rotate. One end of the reversing screw is attached to a cog gear which drives a toothed belt. The rotational motion of the reversing screw is changed from the fixed end of the shade to the moving end of the shade as more fully set forth below, to open and close the shade.

Additional objects of this invention will become apparent upon reference to the specifications and claims as more fully set forth below.

BRIEF DESCRIPTION OF THE DRAWINGS

FIG. 4 is a schematic diagram showing the wiring and the electrical components of one preferred embodiment of the invention.

DETAILED DESCRIPTION OF THE PREFERRED EMBODIMENT

Figure 1:
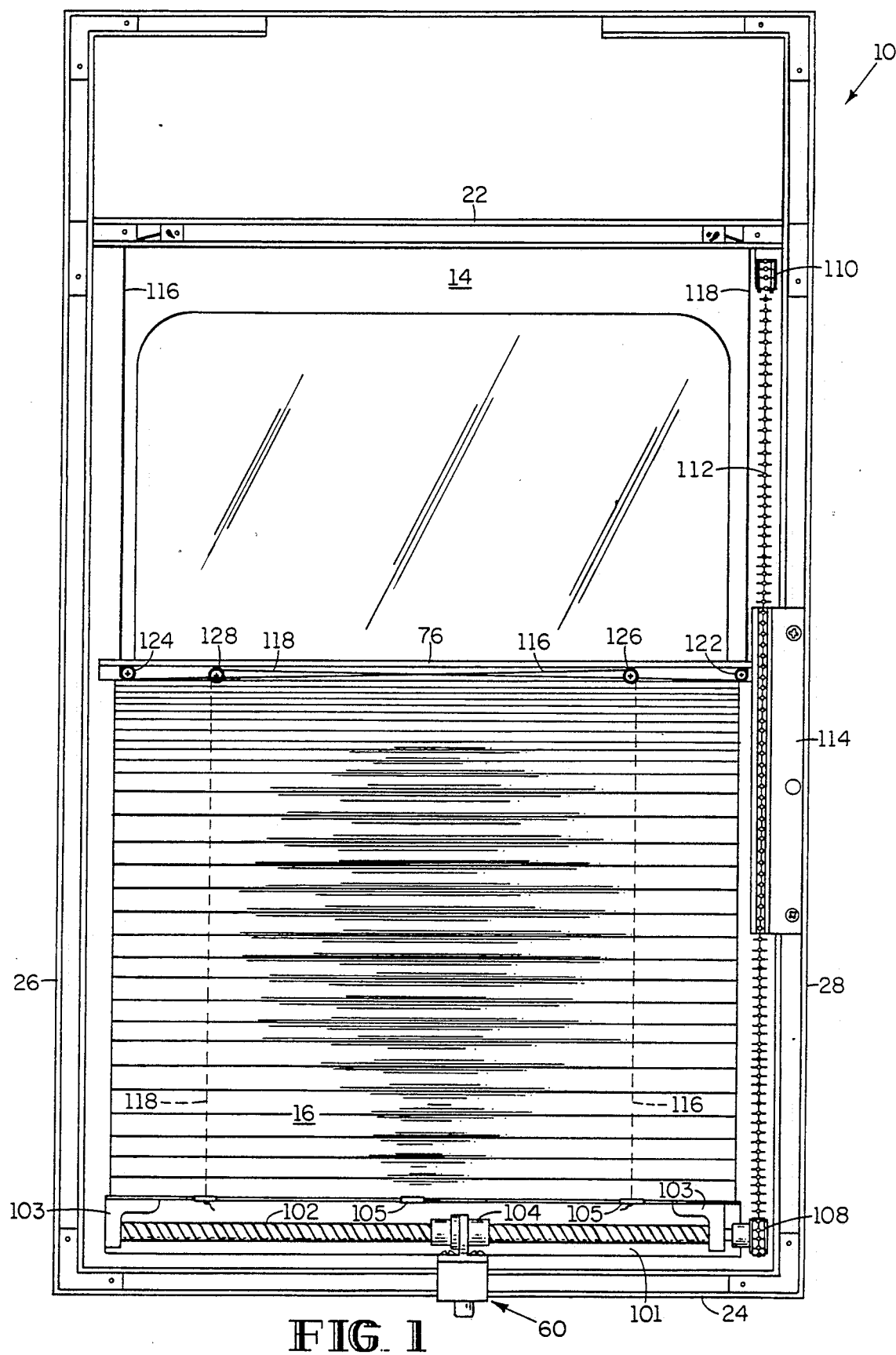
FIG. 1 is a rear elevation view of the internal parts of the window.

FIG. 1 shows generally rectangular, vertically elongated modular aircraft window insert unit (10) with inner window pane (12), generally rectangular mask (14) and collapsible shade (16). Inner window pane (12) is secured within window unit (10) by an inner frame assembly comprising upper and lower frame members (22) and (24), respectively, and left and right frame members (26) and (28), respectively. The inner frame assembly is preferably made from channel aluminum and braced with corner reinforcements (23).

Shade (16) moves vertically between a full-opened and full-closed position. As illustrated in FIG. 1, shade (16) is between a full-opened and full-closed position. When the shade is fully closed, light is substantially prevented from entering the aircraft interior from outside of the aircraft. When the shade is fully opened, visibility is obtained through window unit (10). Shade (16) has a fixed end and a free, moveable end. Shade rail (76) is fastened to the free end of shade (16). Shade rail (76) is preferably made from aluminum stock with an L-shaped cross section clips or other fastening means may be used to attach material of shade (16) to shade rail (76).

Figure 1A:
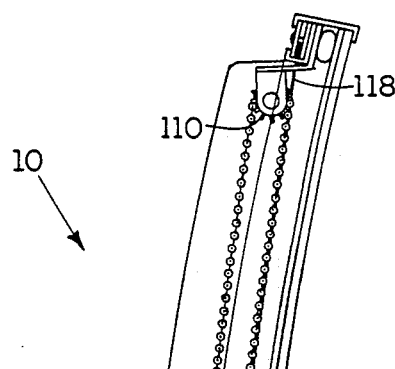
FIG. 1a is a cut-away perspective view showing detail of the frame member, coupler and coupler.

Attached to lower frame member (24) is actuator (60) which is made up of reversing screw (102) and rifled coupler (104). Coupler (104) is designed to slide freely left and right in the horizontal plane as is more fully illustrated in FIG. 1a. FIG. 1a discloses lever (61) and nylon bushing means (120) which seats snugly within lower frame member 24. Actuator (60) has rifled coupler (104) which rides on reversing screw (102). Reversing screw (102) is rotatably mounted to a pair of stubs (103) at either end thereof which in turn are attached to horizontal mounting member (101). Mounting member (101) is securely fastened to the inner frame, preferably lower frame member (24), by screws or other fastening means. Mounting member (101) is preferably an L-shaped aluminum bracket that is fixed along its base to lower frame member (24) and along its leg to stubs (103). The fixed end of window shade (16) is fastened to one leg of mounting means (101) with clips (105) or other fastening means.

Figure 1B:
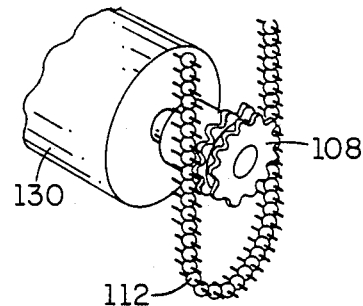
FIG. 1b is an exploded perspective view showing detail of the cog wheel and the cog belt.

Actuator (60) operates horizontally by moving coupler (104) across reversing screw (102) to raise and lower shade (16). The horizontal movement of coupler (104) causes reversing screw (102) to rotate in a first direction when coupler (104) is slid left to right and in the opposite direction when coupler (104) is slid from right to left. The maximum horizontal distance that a coupler moves as it slides between the distal ends of reversing screw (102) is termed "the throw." The throw is substantially equal to the length of the reversing screw. Attached at a first end of reversing screw (102) is drive cog wheel (108) which contains teeth or cogs thereupon, as is more fully disclosed in FIG. 1b. Opposing frame member—that is, upper frame member (22)—contains attached to one end thereof free cog wheel (110). Connecting drive cog wheel (108) with free cog wheel (110) is cog belt (112). This toothed belt is designed to engage the double track cog design of cog wheels (108) and (110) as is more fully disclosed in FIG. 1b.

Figure 1C:
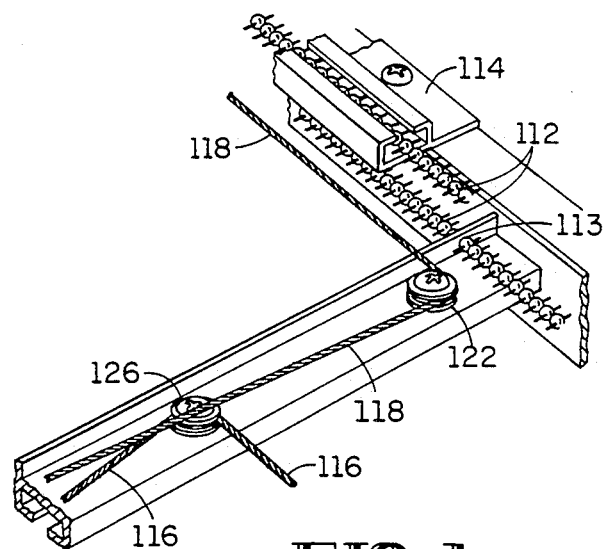
FIG. 1c is a perspective view showing detail of the cog belt guide and the attachment of the cog belt to the shade.

Cog belt (112) is made of a durable, flexible, heat and deterioration resistant material. One belt with such beneficial properties is the "Flex-E-Belt" gear drive belt. "Flex-E-Belt" is the registered trademark of Winfred N. Berg Co., 499 Ocean Avenue, East Rockaway, N.Y. 11518. It is available in a variety of lengths and pitches, made of polyurethane sheathed cable, and requires no lubrication. Cog belt (112) runs in a vertical track along frame member (28) and is attached to the outer edge of shade rail (76) (see FIG. 1c) so that movement of cog belt (112) causes shade rail (76) and shade (16) to move up and down correspondingly. Thus, movement of coupler (104) left and right causes reversing screw (102) to rotate, which causes cog wheel (108) and belt (112) to move, thereby raising and lowering shade (16).

Cog wheels (108) and (110) are available from Pio Design, Middlebury, Conn. 06762. They are preferably made of either stainless steel or 2024-T4 aluminum, and are of a split-hub or double track design. Reversing screw (102) is available from Kerk Motion Products, One Kerk Drive, Hollis N.H. 03049, as an "anti-backlash assembly." However, the "anti-backlash assembly," as described by Kerk, is used to absorb backlash at the screw, which is used to drive the coupler. Here, however, Applicant uses the coupler to drive the screw. Moreover, the couplers supplied by Kerk Motion Products are adapted for use herein by using only the flange portion. The reversing screws are available with stainless steel or Teflon-coated shafts of a variety of length machined to customer specifications.

The distance multiplying effect of the actuator (60) is to allow shade (16) to move through a greater distance than the distance actuator (60) is moved. This is effected by the mechanical advantage of reversing screw (102). For example, if reversing screw (102) had a mechanical advantage of two, the distance that coupler (104) moves horizontally across reversing screw (102) from one end thereof to the other (the throw) would be multiplied by a factor of two and the linear motion of cog belt (112) at cog wheel (108). Thus, by selecting a reversing screw (102) with a mechanical advantage that reflects the ratio of distance between the throw of actuator (60) and the distance between the fully-opened and fully-closed position of shade (16), one can minimize the force multiplier effect that results. That is, any time the linear output of the cog belt is twice the distance of the throw, force required to overcome friction, inertia, etc., is about twice that produced by the sliding shade.

On reversing screw (102), the distance between one thread and the next is the pitch, for a single helix screw. (For multiple helix screws, simply multiply the number of helix times the distance from one thread to the next to find the pitch.) The circumference of the reversing screw divided by the pitch is equal to the Ideal Mechanical Advantage, or $$IMA = \frac{\text{circumference}}{\text{pitch}}$$

To determine the proper length (throw) of a reversing screw of a given circumference and pitch, simply divide the distance between the open and closed position of the shade (shade travel distance) by the ideal mechanical advantage of the reversing screw. This assumes that the radii of the cog wheels are approximately equal to the radius of the reversing screw.

Therefore, to properly choose the reversing screw, one must consider the ratios of the throw to the distance between the shade travel distance. For example, consider a window with an elongated vertical axis with a distance of 18 inches between the open and closed position of shade (16), and a width of 12 inches. Considering the maximum throw to be six inches (practical consideration may dictate the throw length), then the reversing screw must multiply the throw by three to complete the motion of the shade between the open and closed position, so a screw with an IMA of 3 must be chosen. If coupler (104) drives reversing screw (102) through a 3:1 ratio, reversing screw (102) will move at three times the speed coupler (104) is moved.

Figure 2:
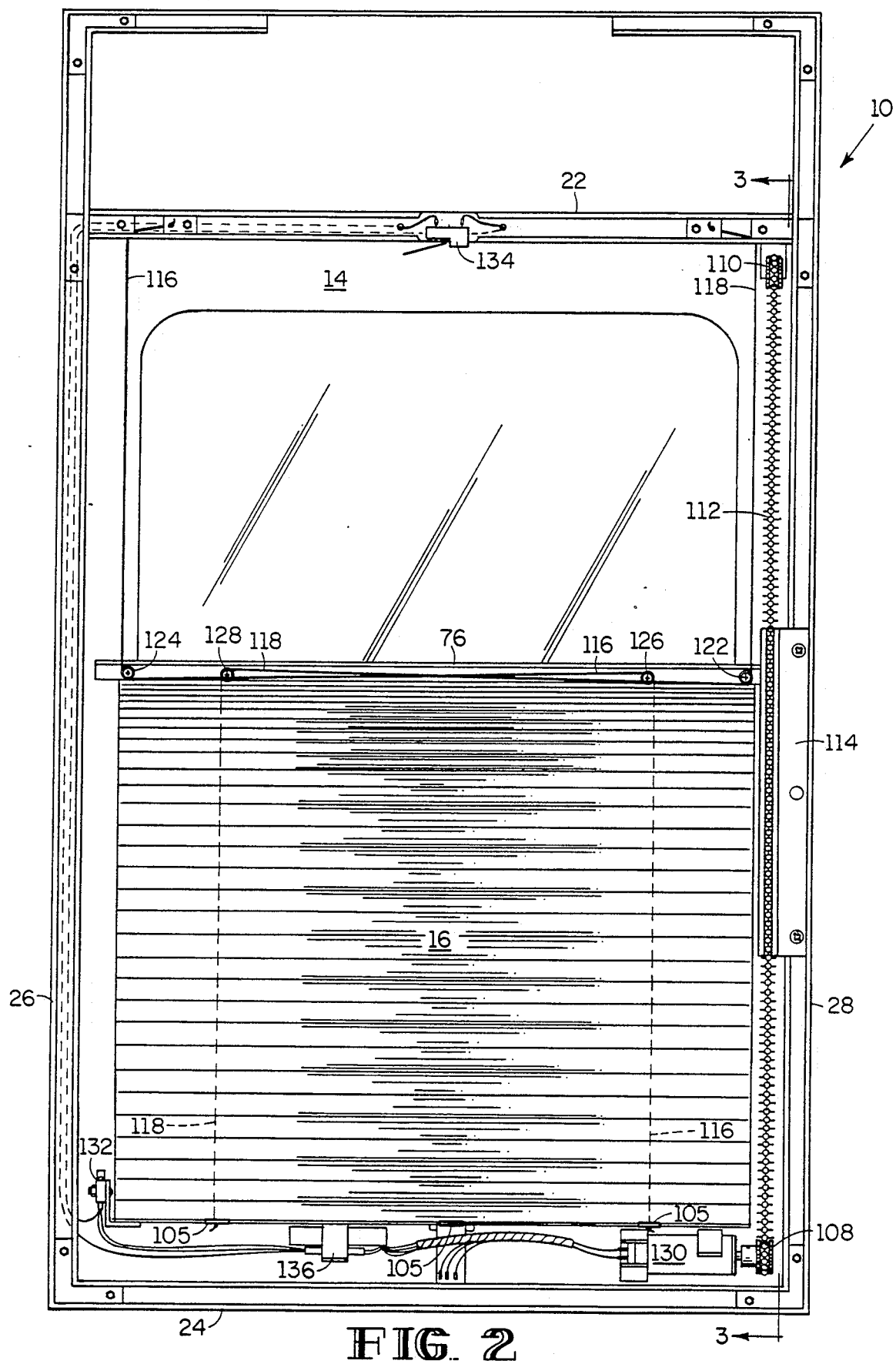
FIG. 2 is a rear view of the window with an electric motor driving the cog wheel.

FIG. 2 shows the preferred embodiment with electric motor (130) operating cog wheel (108) in place of reversing screw (102). Electric motor (130) is energized by the aircraft's power system and is wired to two limit switches (132) and (134), one at each end of shade travel, to de-energize the electric motor when the shade completes its travel, and an externally mounted on/off switch (see FIG. 4) to allow a passenger to set the shade at various positions between open and closed. Control module (136) distributes the electrical energy from the aircraft to the motor and the various switches. The electric motors are available from Micro-Mo Electronics, Inc., St. Petersburg, Fla. 33701. Applicant has found motor type 2233T/030S works well Limit switches (132) and (134) are available from Cherry Co., Waukegan, Ill. 60087. Part number E-61-10H works well (paddle switch). MOdule (136) is available from Microtouch, 359 S. Rose Mead Blvd., Pasadena, Calif. 91107, as the MT 8700 series interface module. Schematic attached as FIG. 4 illustrates the manner in which the above components are assembled and shows the membrane switch panel that allows the passenger to set the shade at any position.

Figure 3:
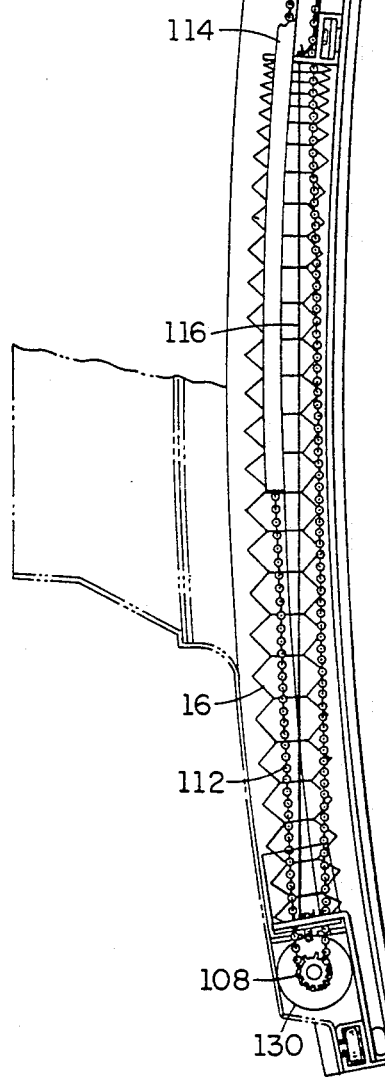
FIG. 3 is a side elevation view of electric motor driven window shade.

FIG. 3 is a cut-away view of the embodiment illustrated in FIG. 2 which view also illustrates the manner in which the bezel is attached to frame members (22) and (24). FIG. 3 also illustrates the manner in which cog belt (112) rides along the edge of vertical frame member (28) (not shown) to carry shade (16) between a full open and full closed position.

Although the invention has been described in connection with a preferred embodiment, it is not intended to limited the invention to the particular form set forth, but on the contrary, it is intended to cover such alternatives, modifications, and equivalents as may be included within the spirit and the scope of the invention as defined by the appended claims.

I claim:

1. A modular window insert unit for use in the cabin of an aircraft or other vehicle, comprising:
   means defining an outer window pane;
   means defining an inner window pane;
   a generally rectangular frame assembly for securing said inner and outer window panes in spaced relation, said frame assembly comprising an upper and a lower member and two side members;
   collapsible shade means secured within said frame assembly, said collapsible shade means with a fixed end and a moving end and extensible between a substantially closed position and a substantially open position;
   actuator means operatively connected to said shade means for moving said shade between the opened and the closed position, said actuator having a throw that is less than the distance between the opened and the closed position, but capable of moving the shade between a substantially opened and substantially closed position by moving said actuator means;
   wherein said actuator means comprises
   a reversing screw and a coupler, said coupler being rifled to match the radius and pitch of said screw and adapted to slide longitudinally along said reversing screw, wherein sliding said coupler in a first direction causes said shade to move towards the open position and when moving said coupler in a second direction causes said shade to move towards the closed position;
   said actuator means further comprising
   a drive cog wheel located at a first end of said reversing screw and a free cog wheel located adjacent to the upper frame member of said frame assembly and an endless cog belt connecting said drive cog wheel with said free cog wheel, wherein said cog belt is attached to the moving end of said collapsible shade means and rotation of said reversing screw causes said drive cog wheel to rotate and thereby causes said shade means to move between the open and the closed position;
   a mounting means capable of mounting said actuator means to said frame assembly;
   a cog belt guide means for maintaining the track of the cog belt between said drive cog wheel and said free cog wheel; and
   an alignment maintenance, said alignment maintenance means to maintain the moving end of said collapsible shade means perpendicular with the direction of travel of said collapsible shade means.

2. A modular window insert unit for use in the cabin of an aircraft or other vehicle, comprising:
   means defining an outer window pane;
   means defining an inner window pane;
   a generally rectangular frame assembly for securing said inner and outer window panes in spaced relation, said frame assembly comprising an upper and a lower member and two side members;
   collapsible shade means secured within said frame assembly, said collapsible shade means with a fixed end and a moving and extensible between a substantially closed position and a substantially open position;
   actuator means operatively connected to said shade means for moving said shade between the opened and the closed position, said actuator having a throw that is less than the distance between the opened and the closed position, but capable of moving the shade between a substantially opened and substantially closed position by moving said actuator means;
   wherein said actuator means comprises a reversing screw and a coupler, said coupled being rifled to match the radius and pitch of said screw and adapted to slide longitudinally along said reversing screw, said shade means being opened and closed by sliding the coupling along the reversing screw thereby causing its rotation, wherein sliding said coupler in a first direction causes said shade to move towards the open position and when moving said coupler in a second direction causes said shade to move towards the closed position.

3. The device as described in claim 2 wherein said actuator means further comprises translational means, said translational means for translating the rotary motion of said reversing screw to the linear motion of said shade means.

4. The device as described in claim 3 wherein said reversing screw is located adjacent to and parallel with the lower frame member of said frame assembly.

5. The device as described in claim 4 wherein said translational means comprises a drive cog wheel located at a first end of said reversing screw and a free cog wheel located adjacent to the upper frame member of said frame assembly and an endless cog belt connecting said drive cog wheel with said free cog wheel, wherein said cog belt is attached to the moving end of said collapsible shade means and rotation of said reversing screw causes said drive cog wheel to rotate and thereby causes said shade means to move between the open and the closed position.

6. The device as described in claim 5 further including a mounting means capable of mounting said actuator means to said frame assembly.

7. The device as described in claim 6 further comprising a cog belt guide means for maintaining the track of the cog belt between said drive cog wheel and said free cog wheel.

8. The device as described in claim 2 further comprising an alignment maintenance means, said alignment maintenance means to maintain the moving end of said collapsible shade means perpendicular with the direction of travel of said collapsible shade means.

9. The device as described in claim 8 wherein said alignment maintenance means comprises a first cable and a second cable, said cables attached to a first and a second end of the lower member of said frame assembly, said cables than extending upward parallel to the direction of travel of said collapsible shade means and perpendicular to the horizontal axis of said collapsible shade means, through the moving end of said collapsible shade means, said cables then directed to opposite ends of the moving end in a manner which criss-crosses said cables along a top side of the moving end, said cables then directed upward to and rigidly attached under tension to the upper framed member of said frame assembly.

10. The device as described in claim 1 wherein said reversing screw is located adjacent to and parallel with the lower frame member of said frame assembly.

* * * * *